J. WILSON.
METHOD OF CLEANSING FILTERING MEDIUMS AND THE LIKE.
APPLICATION FILED JULY 9, 1909.
945,146.
Patented Jan. 4, 1910.
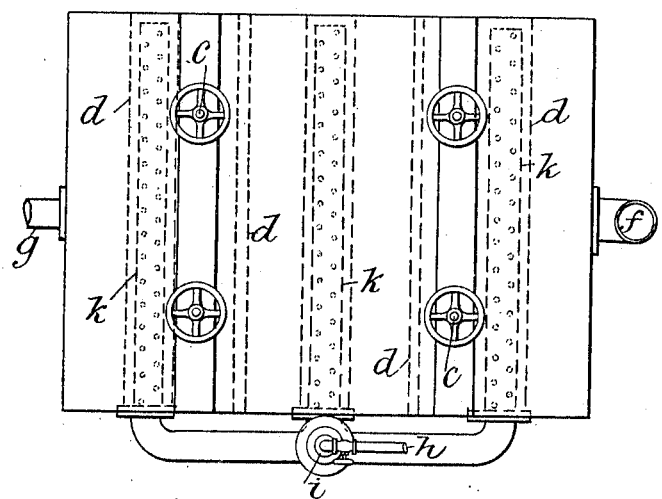
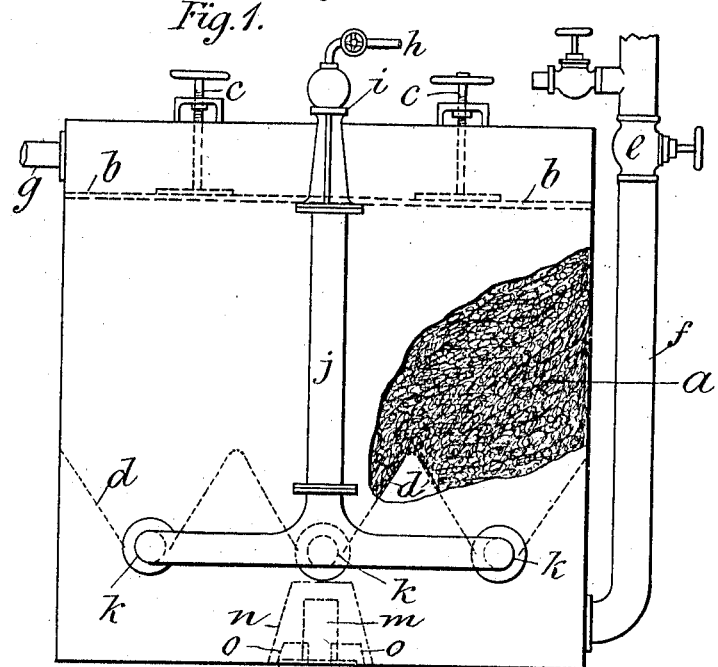

UNITED STATES PATENT OFFICE.

JAMES WILSON, OF WANDSWORTH, ENGLAND.

METHOD OF CLEANSING FILTERING MEDIUMS AND THE LIKE.

945,146.   Specification of Letters Patent.   Patented Jan. 4, 1910.

Application filed July 9, 1909. Serial No. 506,818.

*To all whom it may concern:*

Be it known that I, JAMES WILSON, engineer, a subject of the King of Great Britain, residing at 81 The Grove, St. Ann's Hill, Wandsworth, in the county of Surrey, England, have invented a new and useful Improved Method of Cleansing Filtering Mediums and the Like, of which the following is a specification.

This invention relates to an improved method of cleansing fibrous filtering mediums such as wood wool.

According to this invention fibrous filtering mediums are cleansed by causing water to flow through the mediums while air supplied at or below the bottom of the fibrous material passes upward causing agitation on the surface of the water as it recedes. The filtering mediums may be contained between a grid which is capable of exerting any desired pressure on the top of the mediums and a series of zigzag perforated plates and the water is led into the filter at the bottom and after passing through the mediums is withdrawn from the top of the filter. When it is desired to cleanse the mediums the water is preferably cut off and air is forced in through a pipe leading to the lowest points of the angles made by the perforated plates by means of an injector or from a compressed air reservoir and an outlet at the bottom of the filter is opened, the water then flows downward through the mediums while the air flows upward.

The drawing annexed to the specification illustrates apparatus for use in carrying out the invention.

Figure 1 is a side elevation and Fig. 2 a plan.

*a* is the filtering mediums contained between a grid *b* which may be raised or lowered by the screws *c c* and a series of zigzag perforated plates *d*.

*e* is the valve of the water supply pipe *f* which leads to the bottom of the filter. The water after passing through the mediums *a* is led away by the pipe *g*.

*h* is a steam pipe entering the extension *i* of a pipe *j* for inducing a current of air into the pipe; the pipe *j* leads to perforated pipes *k* extending across the filter for delivering air at the lowest points of the angles made by the perforated plates *d*. For use in cleansing the filter an outlet pipe *l* is provided, the end *m* of which is surrounded by a cap *n* having perforations *o*.

When it is desired to cleanse the filter the screws *c c* are slackened to relieve the pressure on the filtering mediums and the valve *e* is preferably shut and steam is allowed to enter the extension *i* causing air to flow through the pipes *k* which air passes upward through the mediums *a* and through the water causing agitation on the surface. At the same time the valve of the outlet pipe *l* is opened causing the height of the water to be lowered and the air causes the filtering mediums to be agitated throughout as the water recedes.

I am aware that it has been suggested to introduce into a filter in which a sand filter bed is used, air at or near the zone of deposit, that is above the bottom of the filter bed; my invention is not applicable to a sand filter bed but is for cleansing a fibrous filtering medium and is limited to cases in which the air is supplied at or below the bottom of the layer of fibrous material to be cleansed.

What I claim is:—

1. The method of cleansing fibrous filtering mediums, which consists in causing water to flow downward through the mediums while air supplied below the mediums is forced upward therethrough, causing agitation on the surface of the water as it recedes.

2. The method of cleansing fibrous filtering mediums, which consists in filling and surrounding such mediums with water, then drawing off such water from below the filtering mediums and simultaneously causing air to pass up through the mediums and through the water, causing agitation on the surface of the water as it descends.

JAMES WILSON.

Witnesses:
 R. WESTACOTT,
 F. L. RANDS.